Feb. 15, 1966  F. PAASCHE  3,234,611
REINFORCED BELT
Filed Dec. 28, 1961  4 Sheets-Sheet 1
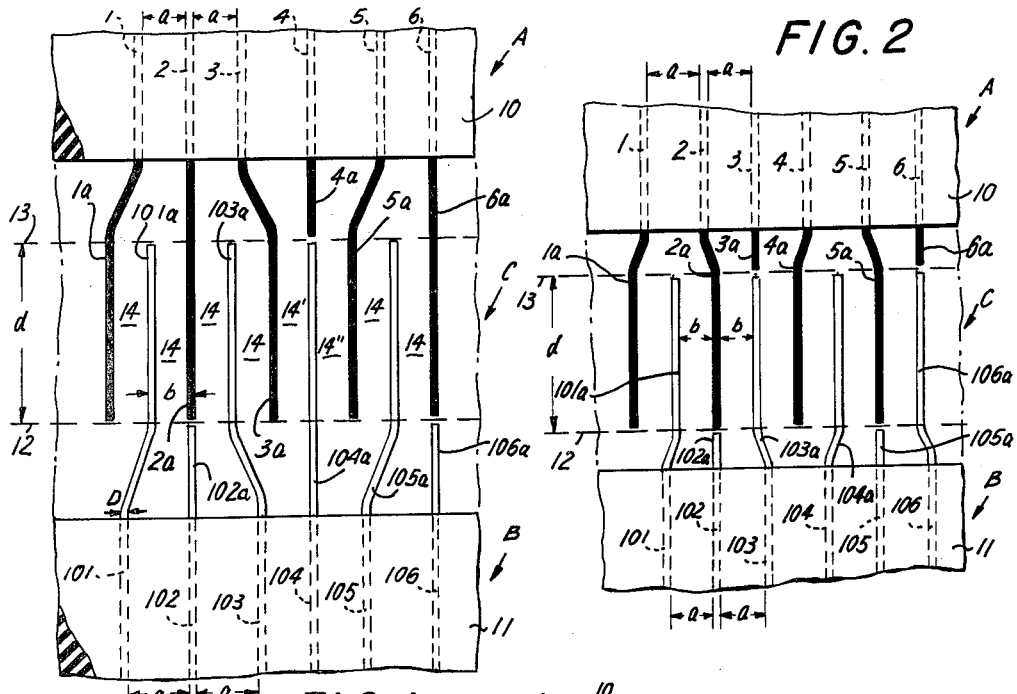
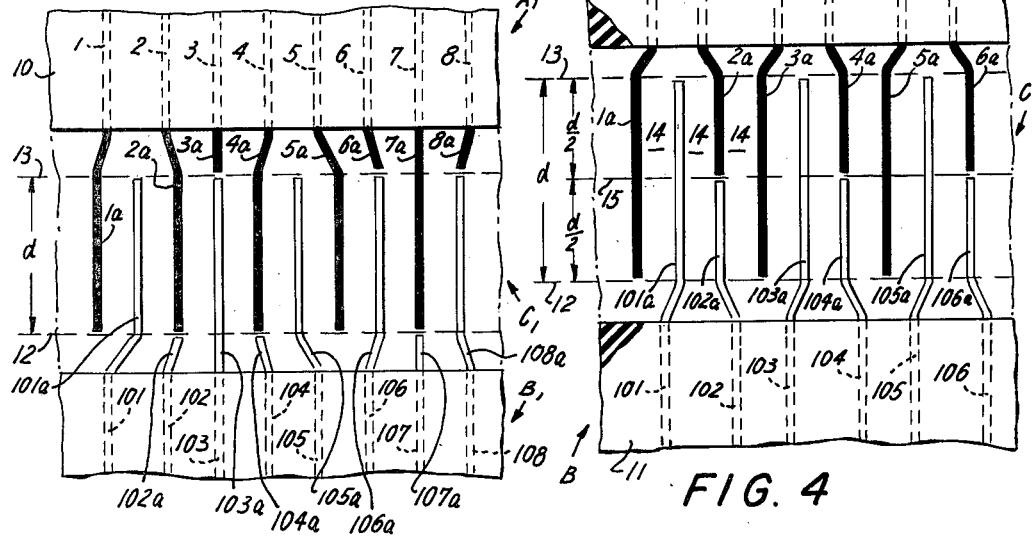
INVENTOR.
FRITZ PAASCHE
BY
Michael S. Striker
ATTORNEY Feb. 15, 1966 F. PAASCHE 3,234,611
REINFORCED BELT
Filed Dec. 28, 1961 4 Sheets-Sheet 2

INVENTOR.
FRITZ PAASCHE
BY
Micheal S. Striker
ATTORNEY

Feb. 15, 1966    F. PAASCHE    3,234,611
REINFORCED BELT
Filed Dec. 28, 1961    4 Sheets-Sheet 3
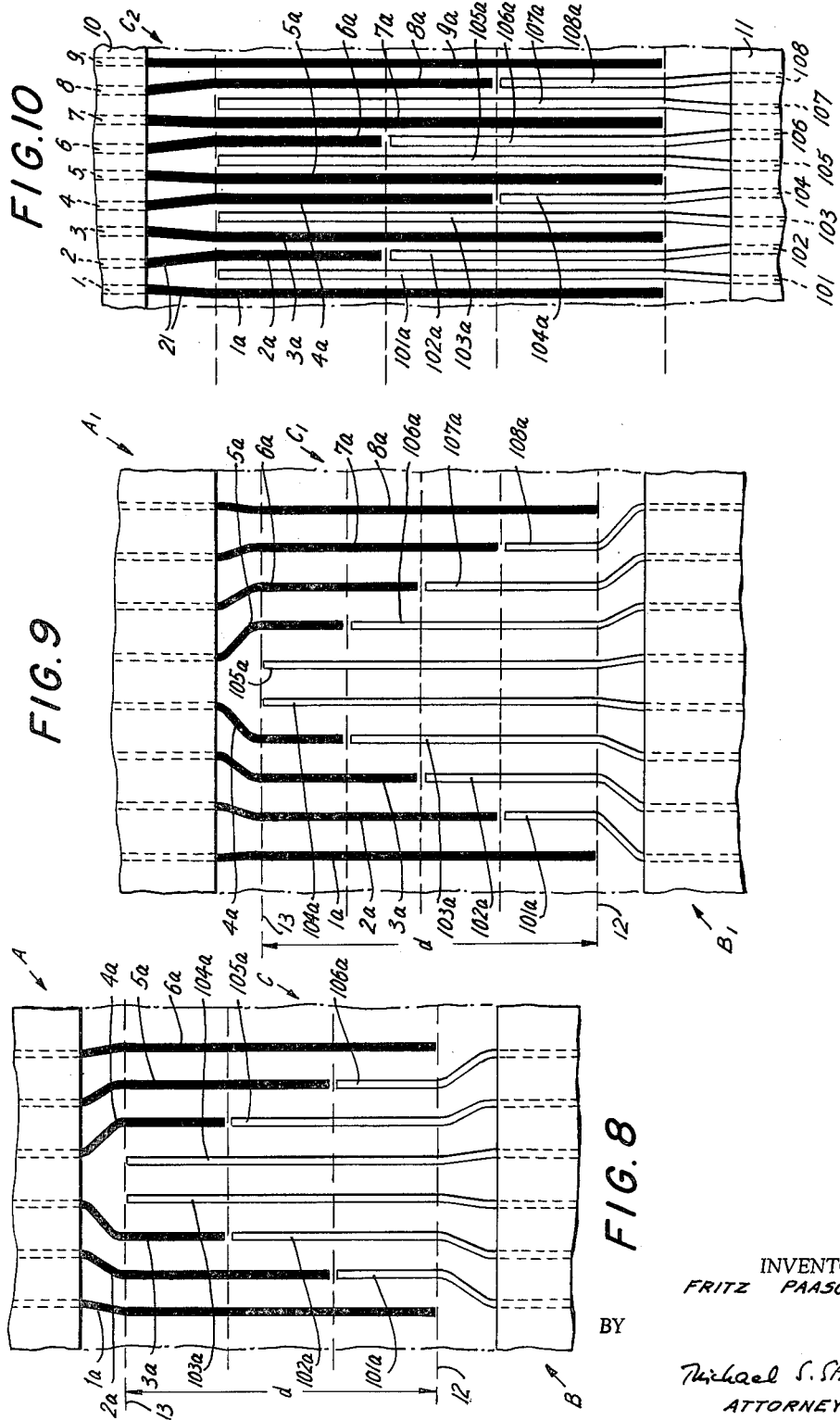
INVENTOR.
FRITZ PAASCHE
BY
Michael S. Striker
ATTORNEY

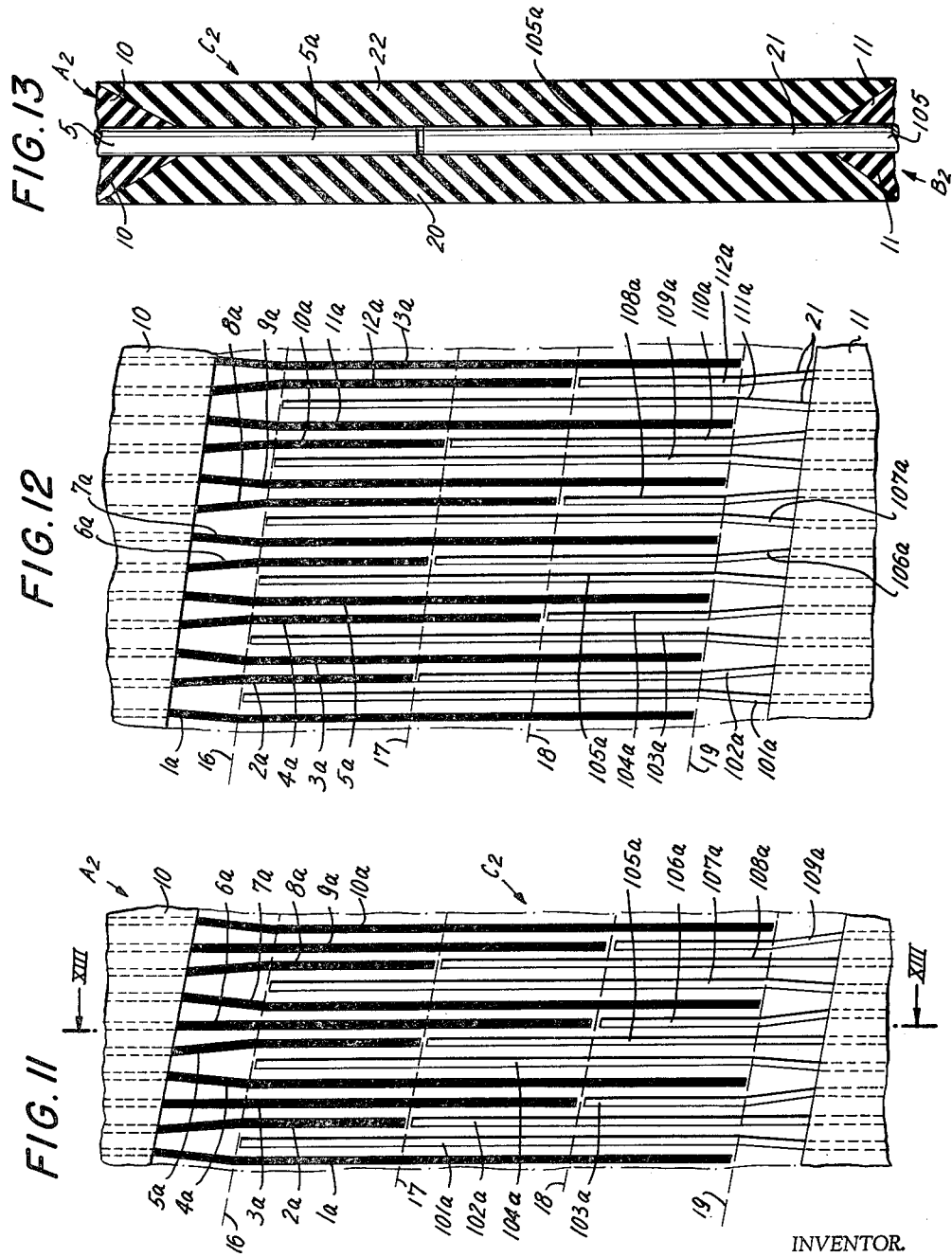

United States Patent Office 3,234,611
Patented Feb. 15, 1966

3,234,611
REINFORCED BELT
Fritz Paasche, Cologne-Nippes, Germany, assignor to Franz Clouth Rheinische Gummiwarenfabrik Aktiengesellschaft, Cologne-Nippes, Germany
Filed Dec. 28, 1961, Ser. No. 162,899
Claims priority, application Germany, Dec. 31, 1960, C 23,080
12 Claims. (Cl. 24—38)

The present invention relates to cord construction belting, and more particularly to an improved joint between the ends of two reinforced belt portions. The invention also relates to a method of joining two belt portions which consist of rubber-like material and which are reinforced by one or more layers of metallic wires, cables or cords.

An important object of the invention is to provide a joint of the type in which the terminal portions of cords embedded in rubber-like bases of two belt portions are surrounded by a filler of rubber-like material, and wherein the strips of filler material extending between the terminal portions in the joint are not subjected to excessive stresses when the belt is in actual use.

Another object of the invention is to provide a joint of the just outlined characteristics wherein the terminal portions of reinforcing cords are arranged in a novel way so that they may form a strong and reliable joint of comparatively small length and/or width.

A further object of the invention is to provide a joint of the above outlined characteristics which can transmit very high stresses even if the reinforcing cords are closely adjacent to each other, and wherein the possibility of breakage is less pronounced than in conventional joints of which I am aware at this time.

A concomitant object of the invention is to provide a novel endless pulley-driving or conveyor belt which embodies one or more joints of the above outlined characteristics.

An additional object of the invention is to provide a novel method of forming a joint of the above outlined characteristics.

With the above objects in view, the invention resides in the provision of a reinforced belt which comprises two elongated belt portions each including a base portion or band of rubber-like material and at least one layer of spaced substantially parallel reinforcing cords, and a joint which connects the belt portions to each other so that tensional stresses taken up by the cords in one of the belt portions are transmitted to the cords in the other belt portion. In accordance with my invention, the terminal portions of the cords in each belt portion extend beyond the respective base portions and are embedded in a filler portion which is integral with and forms a transition between the two base portions. The terminal portions of each cord layer include a first and a second group of terminal portions, and one first group of terminal portions is arranged end-to-end with the other first group of oppositely directed terminal portions. The terminal portions in one of the second groups overlap the oppositely directed terminal portions of the other second group so that the joint between the two belt portions includes the aforementioned filler portion and a novel arrangement of terminal portions which are completely embedded in the filler portion and which in part overlap and in part abut against each other.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a schematic top plan view of a joint between the ends of two belt portions each of which is provided with a layer of reinforcing cords, the filler portion which extends between the bases of the belt portions being shown in phantom lines to expose the terminal portions of the reinforcing cords and the manner in which the terminal portions are arranged in the filler portion;

FIG. 2 is a similar top plan view of a slightly modified joint wherein pairs of oppositely directed overlapping terminal portions are spaced from each other by two pairs of end-to-end arranged terminal portions;

FIG. 3 is a top plan view of a further joint wherein pairs of oppositely directed overlapping terminal portions are separated from each other by three pairs of end-to-end arranged terminal portions;

FIG. 4 illustrates another joint wherein the end-to-end arranged terminal portions are of equal length;

FIG. 8 illustrates a joint or connection which is similar to that of FIG. 7, excepting that the pairs of codirectional and oppositely directed terminal portions are separated from each other by two pairs of end-to-end arranged terminal portions;

FIG. 9 illustrates a further modification of the joints shown in FIGS. 7 and 8 wherein pairs of codirectional and oppositely directed terminal portions are separated from each other by three pairs of end-to-end arranged terminal portions;

FIG. 10 is a schematic top plan view of a joint wherein the tips of end-to-end arranged terminal portions are staggered in the longitudinal direction of the cords and wherein the tips of the terminal portions extend along lines which are substantially perpendicular to the longitudinal direction of the cords;

FIG. 11 is a similar schematic top plan view of a joint wherein pairs of oppositely directed terminal portions are separated from each other by two pairs of end-to-end arranged terminal portions, and wherein the tips of the terminal portions extend along lines which enclose acute angles with the longitudinal direction of the cords;

Figure 5:
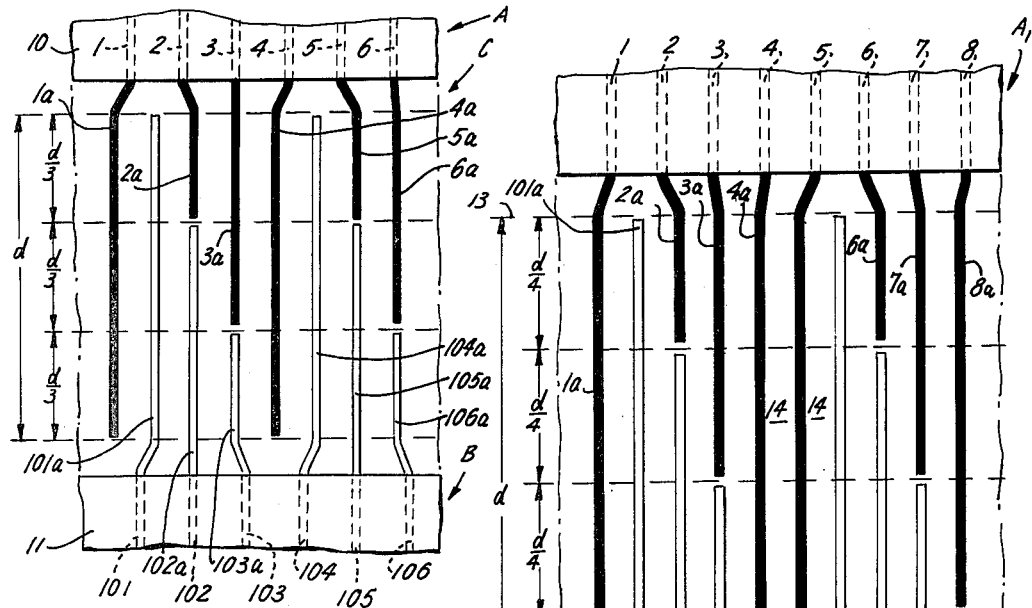
FIG. 5 is a schematic top plan view of a different joint wherein the terminal portions of one cord layer which are arranged end-to-end with the corresponding terminal portions of the other cord layer are of different lengths and are always shorter than the oppositely directed overlapping terminal portions.

FIG. 12 is a schematic top plan view of a joint which is similar to that of FIG. 11, excepting that it comprises a greater number of terminal portions and that pairs of oppositely directed terminal portions are separated by a single pair of end-to-end arranged terminal portions; and FIG. 13 is a greatly enlarged longitudinal section as seen in the direction of arrows from the line XIII—XIII of FIG. 11, showing the manner in which the filler portion between the base portions of two belt portions may be assembled of two rubber-like plates.

Referring now in greater detail to the drawings, and first to FIG. 1, there is shown a reinforced belt which comprises two spaced elongated belt portions A, B having base portions 10, 11 consisting of rubber-like flexible material, a rubber-like filler portion C which forms a transition between the base portions 10, 11, and two layers of reinforcing cords 1–6 and 101–106. The filler portion C is indicated in phantom lines so as to permit observation of the manner in which the terminal portions 1a–6a and 101a–106a of the two cord layers are arranged in the joint between the belt portions A, B.

The main body portions of the cords 1–6 and 101–106 are completely embedded in the rubber-like material of the base portions 10, 11, and it will be noted that the main body portions of these cords are coplanar and are uniformly or nearly uniformly spaced from each other.

In forming the joint between the belt portions A and B, a requisite length of each base portion adjacent to the end thereof is removed so as to expose the terminal portions 1a–6a and 101a–106a, and selected terminal portions are thereupon trimmed so that the trimmed terminal portions may be arranged end-to-end, while the remaining terminal portions overlap and are laterally offset with respect to the corresponding main body portions, whereby the terminal portions in the filler portion C are uniformly or nearly uniformly spaced from each other. The distance or spacing $b$ between the adjacent terminal portions in the filler portion C is less than the distance or spacing $a$ between the adjacent main body portions of the cords in the base portion 10 or 11.

The arrangement of FIG. 1 is such that the terminal portions 1a–6a of the cord layer 1–6 are divided into a first group including the terminal portions 2a, 4a, 6a, and a second group including the remaining terminal portions 1a, 3a, 5a. The terminal portions 101a–106a are also divided into two groups respectively including the terminal portions 102a, 104a, 106a and 101a, 103a, 105a. The terminal portions 1a, 3a, 5a respectively overlap the terminal portions 101a, 103a, 105a, and the terminal portions 2a, 4, 6a are arranged end-to-end with the respective terminal portions 102a, 104a, 106a. The terminal portions of the first groups 2a, 4a, 6a and 102a, 104a, 106a are of different lengths, i.e. longer terminal portions 2a, 6a alternate with a shorter terminal portion 4a, and shorter terminal portions 102a, 106a alternate with a longer terminal portion 104a. The shorter terminal portions 102a, 106a are arranged end-to-end with the longer terminal portions 2a, 6a, and the longer terminal portion 104a is arranged end-to-end with the shorter terminal portion 4a. It will also be noted that the ends or tips of the terminal portions 1a, 2a, 102a, 3a, 5a, 6a, 106a and 101a, 103a, 4a, 104a, 105a extend along two imaginary lines 12, 13 which are perpendicular to the longitudinal direction of the cords 1–6, 101–106 and whose distance or spacing $d$ equals the extent to which certain of the terminal portions 1a–6a and 101a–106a overlap each other.

For the sake of clarity, each of terminal portions 1a–6a is shown with a heavy single line, and each of terminal portions 101a–106a is shown with two lighter lines.

In the embodiment of FIG. 1, two adjacent terminal portions (e.g. 1a, 3a) belonging to the same group (1a, 3a, 5a) are separated by a pair (2a, 102a) of end-to-end arranged terminal portions. The same applies to the terminal portions 3a, 5a or 101a, 103a or 103a, 105a. On the other hand, each pair of end-to-end arranged terminal portions (e.g. 2a, 102a) is separated from the next pair (4a, 104a) of similarly arranged terminal portions by at least one pair (3a, 103a) of overlapping terminal portions. It will be noted that the terminal portions 1a, 3a, 5a overlap the longer end-to-end arranged terminal portion 104a, and that the terminal portions 101a, 103a, 105 overlap the longer end-to-end arranged terminal portions 2a, 6a. In other words, the terminal portions of the second groups 1a, 3a, 5a and 101a, 103a, 105a overlap the longer end-to-end arranged terminal portions of the first groups.

If the belt of FIG. 1 comprises a larger number of cords, the arrangement of terminal portions in the filler portion C follows the same pattern, i.e. the end-to-end arranged terminal portions 6a, 106a are followed by overlapping terminal portions respectively corresponding to terminal portions 105a, 5a, by end-to-end arranged terminal portions corresponding to terminal portions 4a, 104a, and so forth.

The joint of the belt shown in FIG. 1 constitutes a considerable improvement over certain types of conventional joints in which each terminal portion is aligned with the respective main body portion and wherein the spacing between the adjacent cords in each layer is such that the joint may be formed by introducing the terminal portions of cords forming one of the reinforcing layers between the terminal portions of cords which form the other reinforcing layer. In other words, this type of belt comprises cords whose spacing $a$ equals $2b$ plus $D$, wherein D is the diameter of a cord. A serious drawback of such joints is that they can be utilized only in belts which are not subjected to high tensional stresses since the number of cords is rather small owing to the fact that the cords must be spaced at a considerable distance from each other. In such joints, each strip of filler material takes up a force which equals one-half the force $p$ transmitted by one of the terminal portions between which the strip is located.

The joint of FIG. 1 also constitutes an improvement over another type of conventional joints in which the terminal portions of all cords in one of the belt portions are arranged end-to-end with terminal portions of the cords in the other belt portion, i.e. wherein $a=b$. Such joints are provided with terminal portions which are trimmed in such a way that their tips are staggered in the longitudinal direction of the belt and, in order to insure that the strips of filler material between the oppositely directed adjacent terminal portions may transmit substantial tensional stresses, the length of such joints is very great which adds to the manufacturing cost of the belt. On the other hand, a belt wherein each terminal portion is arranged end-to-end with an oppositely directed terminal portion may comprise a very large number of reinforcing cords because the spacing $a$ between the main body portions of the cords is the same as the spacing $b$ between the adjacent terminal portions in the joint. However the strips of filler material in a joint consisting solely of end-to-end arranged terminal portions must take up forces which are greater than one-half the force transmitted by one of the terminal portions adjacent thereto. Furthermore, the distribution of stresses to the strips of filler material is not uniform.

My invention is based on the recognition that a very strong and reliable joint may be formed and that each belt portion may comprise a large number of cords whose spacing is less than $2b+D$ if the terminal portions of the cords in the two belt portions are arranged in such a way that certain terminal portions of cords in one of the belt portions are in end-to-end abutment with corresponding oppositely directed terminal portions of the cords in the other belt portion, and if the remaining terminal portions overlap each other. In other words, if the spacing $a$ between the main body portions of the cords whose terminal portions are not offset with respect to the corresponding main body portions equals $2b+D$, and if the spacing $a$ between the main body portions of cords whose terminal portions are arranged only end-to-end with the oppositely directed terminal portions equals $b$, the deficiencies of such conventional joints may be overcome if one resorts to a distribution of terminal portions which retains the advantages of the above outlined conventional joints but which at least partially eliminates the undesirable characteristics of conventional joints. Therefore, and referring to FIG. 1, instead of utilizing a belt wherein the spacing $a$ between the cords 1–6 or 101–106 is $2b+D$, or wherein the spacing $a$ between the cords equals $b$, I utilize a joint wherein the spacing between the cords 1–6 and 101–106 is somewhere between $b$ and $2b+D$ so that certain terminal portions may be arranged end-to-end and that the remaining terminal portions may overlap each other as well as at least some of the end-to-end arranged terminal portions. Consequently, the belt portions may accommodate a large number of closely adjacent cords which can take up high tensile stresses, and the length of the joint is not excessive.

The transmission of tensile stresses from the terminal portions 1–6 to the terminal portions 101–106 takes place through the strips 14 of filler material between the adjacent coplanar terminal portions. It has been found that the magnitude of stresses which the strips 14 can transmit increases with increasing length $d$ of overlap between oppositely directed terminal portions (e.g. 3a, 104a) which surround the respective strip (14′), and that the magnitude of stresses which the strips 14 can transmit also increases if the width of the strips increases. However, once the width of the strips 14 reaches a given value, the magnitude of stresses which the strips can transmit gradually begins to decrease. It is of great importance that the terminal portions 1a–6a and 101a–106a adhere strongly to the material of the filler portion C, i.e. each terminal portion should be completely embedded in and should not move with respect to the immediately surrounding filler material.

The joint of FIG. 2 differs from the joint of FIG. 1 in that the terminal portions 1a–6a and 101a–106a are grouped in a different way. Thus, the first group of terminal portions 2a, 3a, 5a, 6a is arranged end-to-end with the first group of oppositely directed terminal portions 102a, 103a, 105a, 106a, and the second group of terminal portions 1a, 4a overlaps the second group of oppositely directed terminal portions 101a, 104a. In other words, each pair of adjacent overlapping terminal portions (e.g. 1a, 101a) which extend in opposite directions is separated from the next pair of overlapping oppositely directed terminal portions (4a, 104a) by two pairs of end-to-end arranged terminal portions (2a, 102a and 3a, 103a). Thus, the joint of FIG. 2 comprises a larger number of end-to-end arranged terminal portions.

The end-to-end arranged terminal portions 2a, 3a, 5a, 6a and 102a, 103a, 105a, 106a consist of alternating longer terminal portions 2a, 5a and 103a, 106a and shorter terminal portions 3a, 6a and 102a, 105a.

The joint of FIG. 3 connects two belt portions A₁, B₁ each of which includes a layer of eight spaced reinforcing cords 1–8 and 101–108, respectively. The terminal portions 1a–8a and 101a–108a of these cords are grouped in such a way that each pair of adjacent overlapping terminal portions (e.g. 1a, 101a) is separated from the next pair of adjacent overlapping terminal portions (5a, 105a) by three pairs of end-to-end arranged terminal portions (2a–102a, 3a–103a, 4a–104a). Thus, the joint of FIG. 3 comprises a very large number of end-to-end arranged terminal portions which exceeds the number of end-to-end arranged terminal portions in the joint of FIG. 1 or 2. The terminal portions 1a–8a and 101a–108a are embedded in the rubber-like material of the filler portion C₁.

As in the embodiments of FIGS. 1 and 2, the terminal portions of the groups 2a, 3a, 4a, 6a, 7a, 8a and 102a, 103a, 104a, 106a, 107a, 108a consist of alternating longer terminal portions (2a, 4a, 7a and 103a, 106a, 108a) and shorter terminal portions (3a, 6a, 8a and 102a, 104a, 107a). A longer terminal portion (e.g. 2a) extending in a first direction is always in end-to-end alignment with a shorter terminal portion (102a) which extends in the opposite direction.

A characteristic common to the embodiments of FIGS. 1 to 3 is that each pair of adjacent oppositely directed overlapping terminal portions is followed by at least one pair of end-to-end arranged terminal portions, that the spacing $a$ between the main body portions of the cords in the base portions 10, 11 is at least nearly uniform, that the spacing $b$ between the adjacent substantially coplanar terminal portions in the filler portion C or C₁ is at least nearly uniform, and that each terminal portion extending into the zone between the lines 12, 13 is disposed between and is overlapped by a pair of oppositely directed terminal portions each of which extends throughout the full distance $d$. For example, in FIG. 1 the zone between the lines 12, 13 accommodates adjacent but oppositely directed terminal portions 1a, 101a, 2a, 103a, 3a, 104a, 5a, 105a. In FIG. 2, this zone accommodates oppositely directed terminal portions 1a, 101a, 2a, 103a, 4a, 104a, 5a, 106a, and in FIG. 3 the terminal portions 1a, 101a, 2a, 103a, 4a, 105a, 5a, 106a, 7a, 108a. Consequently, each strip of the filler portion C or C₁, between the lines 12, 13 transmits tensional stresses from the cords of the one belt portion to the cords of the other belt portion or vice versa.

If the tensional stress transmitted by each of the cords 1–6 in FIG. 1 is $p$, the stress taken up by each of the strips 14 of filler material between the adjacent terminal portions in the zone bounded by the lines 12, 13 exceeds $p/2$ because the terminal portion 4a does not extend into this zone and, consequently, the tensional force $p$ transmitted by the cord 4 must be taken up by the strips 14′, 14″ bounding the terminal portion 104a. In addition, the strip 14′ takes up one-half of the force $p$ transmitted by the terminal portion 3a, and the strip 14″ takes up one-half of the force transmitted by the terminal portion 5a.

FIG. 4 illustrates a different belt which comprises a joint extending between the belt portions A, B and in which each terminal portion extends into the zone between the spaced lines 12, 13. However, the groups 2a, 4a, 6a and 102a, 104a, 106a of end-to-end arranged terminal portions consist of terminal portions of identical lengths $d/2$ so that the ends of abutting terminal portions 2a–102a, 4a–104a, 6a–106a extend along a line 15 which is perpendicular to the longitudinal direction of the cords 1–6 and 101–106 and is located midway between the lines 12, 13 whose distance $d$ from each other equals the length of pairwise arranged oppositely directed overlapping terminal portions 1a–101a, 3a–103a, 5a–105a. The length of the joint shown in FIG. 4 exceeds the length of joints shown in FIGS. 1–3, i.e. the distance $d$ in FIG. 4 exceeds the distance $d$ in FIGS. 1–3.

In the embodiment of FIG. 4, each terminal portion extends into the zone between the lines 12, 13 and, therefore, each of terminal portions 1a–6a transmits tensional stresses to the strips 14 of filler material between the adjacent terminal portions. The terminal portion 1a will transmit the full tensional force $p$ of the cord 1 to the strip 14a between the terminal portions 1a, 101a, so that the terminal portion 101a transmits the full tensional force of the cord 1 and also a portion of the force of the cord 2 because it is adjacent to one side of the shorter terminal portion 2a which transmits tensional stresses to the strip 14 located between the terminal portions 2a, 101a.

In FIG. 5, the terminal portions 1–6 and 101–106 include terminal portions (2a, 5a and 103a, 106a) of shortest length, terminal portions (3a, 6a and 102a, 105a) of medium length, and terminal portions (1a, 4a and 101a, 104a) of maximum length. The pairs of adjacent overlapping oppositely directed terminal portions (e.g. 1a, 101a) are separated from similarly overlapping oppositely directed terminal portions (4a, 104a) by two pairs (2a–102a, 3a–103a) of end-to-end arranged terminal portions. The length $d$ of the overlapping terminal portions 1a, 101a, 4a, 104a equals the combined length of each pair of end-to-end arranged terminal portions. For example, the length of terminal portion 2a may be $d/3$ and the length of the aligned terminal portion 102a is then $2d/3$.

Figure 6:
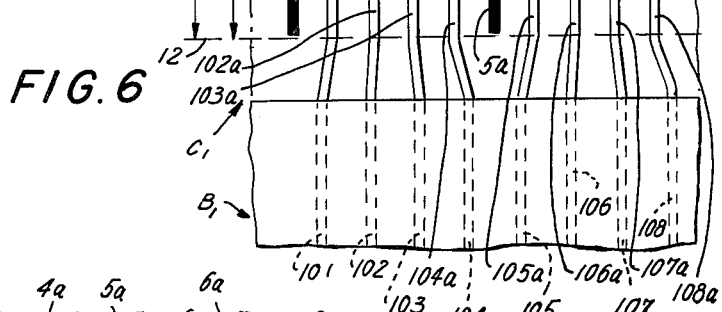
FIG. 6 illustrates a joint which is similar to that of FIG. 5 excepting that pairs of overlapping terminal portions are separated from each other by three pairs of end-to-end arranged shorter terminal portions of different lengths.

FIG. 6 illustrates an analogous joint which connects belt portions A₁, B₁ each of which comprises a layer respectively consisting of eight cords 1–8, 101–108. The length $d$ of overlapping terminal portions 1a, 101a, 5a, 105a equals the combined length of end-to-end arranged terminal portions 2a–102a, 3a–103a, 4a–104a, 6a–106a, 7a–107a, 8a–108a, and the groups of end-to-end arranged terminal portions are of three different lengths $d/4$, $d/2$, $3d/4$. It will be noted that each pair of oppositely directed overlapping terminal portions (1a, 101a) is separated from the next pair of similarly overlapping terminal portions (5a, 105a) by three pairs (2a–102a, 3a–103a, 4a–104a) of end-to-end arranged terminal portions. As in the embodiments of FIGS. 4 and 5, each terminal portion extends into the zone between the lines 12, 13. Another feature common to the embodiments of FIGS. 4–6 is that each terminal portion is laterally offset with respect to its main body portion in order to make sure that the spacing between the adjacent terminal portions in the filler portion $C_1$ is at least nearly uniform. The number of strips 14 which must transmit a full tensional force $p$ is greatest in the joint of FIG. 6 and is smallest in the joint of FIG. 4.

Figure 7:
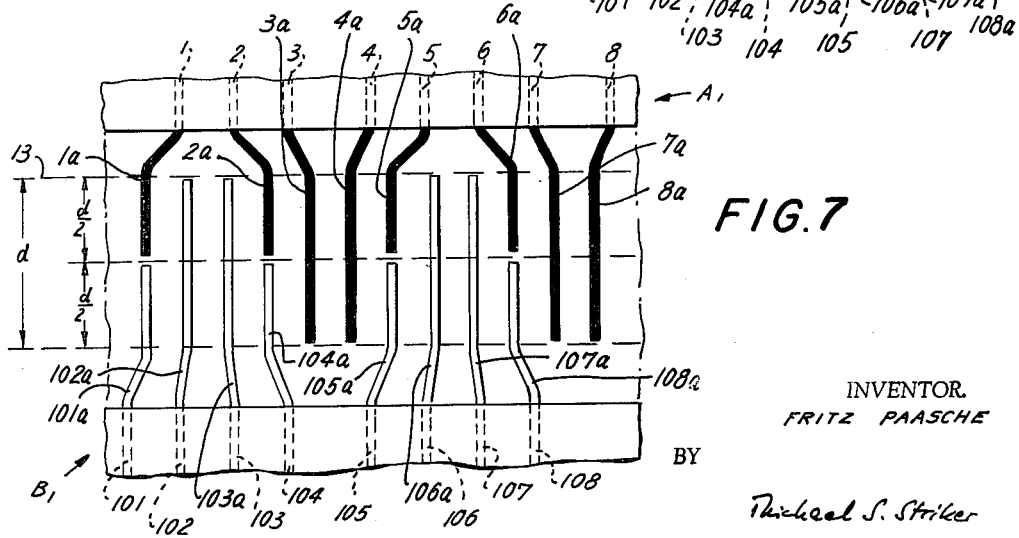
FIG. 7 illustrates a joint wherein pairs of codirectional and of oppositely directed terminal portions overlap and are separated from each other by pairs of end-to-end arranged terminal portions.

FIG. 7 illustrates a joint wherein each of terminal portions 1a–8a and 101a–108a extends into the zone between the lines 12, 13. However, the full-length terminal portions 102a–103a, 106a–107a and 3a–4a, 7a–8a are arranged in pairs so that the pairs of terminal portions 102a–103a, 106a–107a extending in one direction alternate with pairs of terminal portions 3a–4a, 7a–8a which extend in the opposite direction. Again, all terminal portions are laterally offset with respect to the main body portions of the respective cords 1–8 and 101–108 so that the terminal portions may be uniformly spaced in the filler portion $C_1$. The end-to-end arranged terminal portions 1a–101a, 2a–104a, 5a–105a, 6a–108a are disposed between the pairs of codirectional terminal portions 102a–103a, 3a–4a, 106a–107a, 7a–8a, and the length of end-to-end arranged terminal portions may, but need not, equal $d/2$.

The joint of FIG. 8 is analogous to that of FIG. 5, excepting that the manner in which the terminal portions 1a–6a alternate with oppositely directed terminal portions 101a–106a is different. The full-length (i.e. untrimmed) terminal portions 103a, 104a are separated from oppositely directed overlapping full-length terminal portions 1a, 6a by two pairs of end-to-end arranged terminal portions, i.e. the pairs 2a–101a, 3a–102a are disposed at one side of the terminal portions 103a, 104a, and the pairs 4a–105a, 5a–106a are disposed at the other side of these terminal portions. The length of each of terminal portions 1a, 103a, 104a, 6a equals the combined length of a pair of end-to-end arranged terminal portions.

In FIG. 9, the joint is similar to that of FIG. 6, excepting that the longest upwardly extending terminal portions 104a, 105a are separated from the longest overlapping and opposite directed terminal portions 1a, 8a by three pairs of end-to-end arranged terminal portions. Thus, the pairs 2a–101a, 3a–102a, 4a–103a separate the terminal portions 103a, 104a from the terminal portion 1a, and the pairs 5a–106a, 6a–107a, 7a–108a separate the terminal portions 104a, 105a from the terminal portion 8a.

In FIGS. 7 to 9, each terminal portion is laterally offset or deflected from alignment with the main body portion of the respective cord to make sure that the terminal portions in the filler portion C or $C_1$ are at least nearly uniformly spaced from each other. Another common characteristic of the joints shown in FIGS. 7 to 9 is that each terminal portion extending into the zone between the lines 12, 13 is disposed between an oppositely directed and a codirectional terminal portion. Thus, and referring to FIG. 7, it will be noted that the terminal portion 102a is located between an oppositely directed terminal portion 1a and a codirectional terminal portion 103a. The same applies to all other terminal portions excepting, of course, the two outermost terminal portions.

Referring to FIG. 10, there is shown a joint which is very similar to that of FIG. 4 excepting that the layer of cords embedded in the base portion 10 comprises nine cords 1–9, that the layer of cords embedded in the base portion 11 comprises eight cords 101–108, and that the end-to-end arranged pairs of terminal portions 2a–102a, 4a–104a, 6a–106a, 8a–108a are of different lengths and that shorter terminal portions 2a, 6a alternate with longer terminal portions 4a, 8a. The combined length of each pair of end-to-end arranged terminal portions approximates the length of overlapping terminal portions 1a, 3a, 5a, 7a, 9a and 101a, 103a, 105a, 107a. Of course, it will be readily understood that, in each embodiment of my invention, the number of cords in each belt portion may be much higher than the number illustrated in FIGS. 1–10 since I decided to illustrate belt constructions with a comparatively small number of reinforcing cords solely for the purpose of better understanding of the invention, the number of cords depending on the diameters of the cords, on the width of the belt portions, on the intended use of the reinforced belt, and on certain other factors.

An important advantage of the joint shown in FIG. 10 over the joint of FIG. 4 is that the ends or tips of the end-to-end arranged terminal portions are staggered in the longitudinal direction of the belt to make sure that the joint will not break so as to project the tips of the terminal portions through the filler portion $C_2$ when the belt is flexed at the joint. In other words, it is desirable to stagger the tips of the end-to-end arranged terminal portions in the longitudinal direction of the joint and, as shown in FIGS. 11 and 12, it is also advisable to arrange the tips of the terminal portions 1a–10a and 101a–109a (FIG. 11) or 1a–13a and 101a–112a (FIG. 12) along lines 16, 17, 18, 19 which enclose acute angles with the longitudinal direction of the cords. Such arrangement further reduces the likelihood that the joint would break in response to flexing of the belt about a fold line which is substantially perpendicular to the longitudinal direction of the cords. Of course, the length of the joints of FIGS. 10, 11, 12 exceeds the length of the joint shown in FIG. 4 because the length of overlap between say the terminal portions 2a, 101a of FIG. 11 would otherwise be less than the length of overlap between the terminal portions 2a, 101a in FIG. 4.

It will be noted that the joint of FIG. 11 corresponds substantially to that of FIG. 5, excepting that the tips of the terminal portions are arranged along slanted lines 16–19. The joint of FIG. 12 corresponds to that of FIG. 10, excepting that the tips of the terminal portions are again arranged along slanted lines 16–19.

The method of forming a joint of the type shown in FIG. 11 is illustrated in FIG. 13. It is assumed that the belt portions $A_2$, $B_2$ were manufactured in a preceding operation and that these belt portions form the longitudinal end portions of an elongated belt which should be transformed into an endless belt for use as a pulley belt or as an endless conveyer. The rubber-like material of the bases 10, 11 at the longitudinal ends of the belt portions $A_2$, $B_2$ is removed so as to expose the terminal portions 1a–10a and 101a–109a, whereupon the terminal portions 2a, 3a, 5a, 6a, 8a, 9a and 102a, 103a, 105a, 106a, 108a, 109a are trimmed or cut off in such a way that these terminal portions may be arranged end-to-end in a manner as shown in FIG. 11. A plate-like body 20 of unvulcanized rubber-like material is then placed at one side of coplanar terminal portions 1a–10a, 101a–109a and is supported on a suitable working platform, not shown. Before being placed against the terminal portions, the body 20 and the terminal portions are coated with a suitable adhesive substance as rubber-solution so that the terminal portions, once arranged in a manner as shown in FIG. 11, will adhere to the body 20 and will not change their positions during subsequent stages of the joint-forming operation. As shown in FIG. 10, the transitions 21 between the terminal portions and the main body portions of the respective cords need not be S-shaped as illustrated in FIGS. 1–9 but may consist of straight cord portions.

In the next step, a second plate-like body 22 of rubber-like material is placed against the still exposed sides of the terminal portions 1a–10a and 101a–109a, and the two bodies are then vulcanized so as to form an integral unit with and a smooth transition between the base portions 10, 11 of the belt $A_2$, $B_2$.

It has been found that the step of securing the terminal portions to the body 20 and/or 22 by a suitable adhesive is of considerable importance in order to obtain a strong and reliable joint and also to facilitate handling of the belt portions during the vulcanizing step. It is also important to start with fresh, unvulcanized plates 20, 22 since the vulcanizing step actually provides a very strong bond between the plates 20, 22 and the base portions 10, 11 as well as between the plates 20, 22 and the surfaces of the terminal portions.

As shown in FIG. 13, the ends of the base portions 10, 11 may assume the form of wedges to provide a larger area of contact with the complementary ends of the plates 20, 22. When the vulcanizing step is completed, the plates 20, 22 together form the filler portion $C_2$ of FIG. 11.

The relationship of the spacing $a$ between the adjacent cords to the spacing $b$ between the adjacent terminal portions of the belt which embodies my invention may be determined as follows:

If $z$ is the number of cords in the belt portion A of FIG. 1, if $z'$ is the number of oppositely directed terminal portions (101a, 103a, 104a, 105a) extending all the way between the lines 12, 13 of the joint, and if D is the diameter of a cord, then (I) $\quad (a+D) \cdot z = (b+D) \cdot z + (b+D) \cdot z'$, or (II) $\quad a+D = b+D + (b+D)\dfrac{z'}{z}$, or (III) $\quad a = b\left(1+\dfrac{z'}{z}\right) + D\dfrac{z'}{z}$ In aforementioned conventional joints in which $z'=z$, the spacing $a$ between the main body portions of the cords equals $2b+D$ as can be readily derived by substituting $z=z'$ in the Formula III.

In other aforementioned conventional joints in which each terminal portion of one layer of cords is arranged end-to-end with a terminal portion of the other cord layer, $z=0$ and a substitution of this value in the Formula III indicates that $a=b$, i.e. that the spacing between the main body portions of the cords is the same as the spacing between the adjacent terminal portions in the joint.

If the spacing $a$, the spacing $b$, the number $z$ of cords in the belt, and the diameter D of a cord are known, the ratio $z'/z$ may be obtained by regrouping the Formula II in the following manner:

(IV) $\quad a-b = (b+D) \cdot \dfrac{z'}{z}$, or (V) $\quad \dfrac{z'}{z} = \dfrac{a-b}{b+D}$ By utilizing the Formula V, the designer can determine whether he should utilize a joint as shown in FIG. 1, 4 or 7 in which $$\dfrac{z'}{z} = \dfrac{1}{2}$$

whether he should utilize a joint of the type shown in FIG. 2, 5 or 8 in which $$\dfrac{z'}{z} = \dfrac{1}{3}$$

or whether he should utilize a joint as shown in FIG. 3, 6 or 9 in which $$\dfrac{z'}{z} = \dfrac{1}{4}$$

For example, in FIG. 9 the number $z$ of cords in the belt portion $A_1$ is eight and the number $z'$ of oppositely directed terminal portions 104a, 105a extending all the way between the lines 12, 13 is two. In FIG. 8, the number $z$ of cords in the belt portion A is six and the number of oppositely directed terminal portions (103a, 104a) extending between the lines 12, 13 is two. In FIG. 7 the number of cords in the belt portion $A_1$ is eight and the number of oppositely directed terminal portions (102a, 103a, 106a, 107a) extending all the way between the lines 12, 13 is four. The smaller the ratio $z'/z$, the longer is the joint between the two belt portions, and the smaller this ratio the greater are the forces which the strips 14 in the joints of FIGS. 1–3 must transmit.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. In a reinforced belt, in combination, a first and a second elongated belt portion each including a base portion of rubber-like material and at least one layer of spaced substantially parallel reinforcing cords, said cords completely surrounded by and extending in the longitudinal directions of the respective base portions and each thereof having a terminal portion projecting beyond the respective base portion; and a filler portion of rubber-like material disposed between said base portions, said filler portion completely surrounding said terminal portions and all terminal portions of the cords in each of said layers consisting of a first and a second group of terminal portions, said second group of terminal portions in each layer including all terminal portions in said layer with the exception of those terminal portions of said layer which are included in said first group, the terminal portions of one of said first groups arranged end-to-end with the terminal portions of the other first group, and the terminal portions of said second groups being out of end-to-end alignment with each other, the distribution of said terminal portions transversely of said base portions being such that at least the majority of terminal portions of a layer of cords in one of said belt portions is adjacent to and overlaps at least one terminal portion of a layer of cords in the other belt portion.

2. In a reinforced belt, in combination, a first and a second elongated belt portion each including a base portion of rubber-like material and at least one layer of spaced substantially parallel reinforcing cords, said cords comprising main body portions completely surrounded by and extending in the longitudinal directions of the respective base portion and terminal portions projecting beyond the respective base portion; and a filler portion of rubber-like material disposed between said base portions, said filler portion completely surrounding said terminal portions and all terminal portions of the cords in each of said layers consisting of a first and a second group of terminal portions, said second group of terminal portions in each layer including all terminal portions in said layer with the exception of those terminal portions of said layer which are included in said first group, the terminal portions of one of said first groups arranged end-to-end with the terminal portions of the other first group, the terminal portions of said second groups being out of end-to-end alignment with each other, the distribution of said terminal portions transversely of said base portions being such that at least the majority of terminal portions of a layer of cords in one of said belt portions is adjacent to and overlaps at least one terminal portion of a layer of cords in the other belt portion, at least some of said terminal portions being laterally offset relative to the respective main body portions and said terminal portions being substantially uniformly spaced from each other throughout said filler portion and said main body portions being substantially uniformly spaced from each other at least in the proximity of said filler portion, the average spacing between said main body portions being greater than the average spacing between said terminal portions.

3. In a reinforced belt, in combination, a first and a second elongated belt portion each including a base portion of rubber-like material and at least one layer of spaced substantially parallel reinforcing cords, said cords comprising main body portions completely surrounded by and extending in the longitudinal directions of the respective base portions and each main body portion having a terminal portion projecting beyond the respective base portion; and a filler portion of rubber-like material disposed between said base portions, said filler portion completely surrounding said terminal portions and the terminal portions of the cords in each of said layers including a first and a second group of terminal portions, the terminal portions of one of said first groups arranged end-to-end with the terminal portions of the other first group, and the terminal portions of said second groups being out of end-to-end alignment with each other, the distribution of said terminal portions transversely of said base portions being such that at least the majority of terminal portions of a layer of cords in one of said belt portions is adjacent to and overlaps at least one terminal portion of a layer of cords in the other belt portion, said terminal portions being substantially uniformly spaced from each other throughout said filler portion and at least some of said terminal portions being laterally offset relative to the respective main body portions, said second groups of terminal portions including pairs of adjacent terminal portions and such pairs of terminal portions being separated from each other by at least two terminal portions of each first group, each terminal portion of said first groups being disposed between a shorter and a longer terminal portion and the end of each terminal portion of said first groups being located substantially midway between the ends of the respective shorter and longer terminal portions.

4. In a reinforced belt, in combination, a first and a second elongated belt portion each including a base portion of rubber-like material and at least one layer of spaced substantially parallel reinforcing cords, said cords comprising main body portions completely surrounded by and extending in the longitudinal directions of the respective base portions and each main body portion having a terminal portion projecting beyond the respective base portion; and a filler portion of rubber-like material disposed between said base portions, said filler portion completely surrounding said terminal portions and the terminal portions of the cords in each of said layers including a first and a second group of terminal portions, the terminal portions of one of said first groups arranged end-to-end with the terminal portions of the other first group, and the terminal portions of said second groups being out of end-to-end alignment with each other, the distribution of said terminal portions transversely of said base portions being such that at least the majority of terminal portions of a layer of cords in one of said belt portions is adjacent to and overlaps at least one terminal portion of a layer of cords in the other belt portion, the terminal portions of each of said second groups being disposed in pairs and each pair of terminal portions of one of said second groups being separated from a pair of terminal portions of the other second group by one terminal portion of each of said first groups, the ends of terminal portions of said first groups being disposed on a line extending substantially midway between said base portions and said terminal portions being substantially uniformly spaced from each other throughout said filler portion, at least some of said terminal portions being laterally offset relative to the respective main body portions.

5. In a reinforced belt, in combination, a first and a second elongated belt portion each including a base portion of rubber-like material and at least one layer of spaced substantially parallel reinforcing cords, said cords comprising main body portions completely surrounded by and extending in the longitudinal directions of the respective base portions and each main body portion having a terminal portion projecting beyond the respective base portion; and a filler portion of rubber-like material disposed between said base portions, said filler portion completely surrounding said terminal portions and the terminal portions of the cords in each of said layers including a first and a second group of terminal portions, the terminal portions of one of said first groups arranged end-to-end with the terminal portions of the other first group, and the terminal portions of said second groups being out of end-to-end alignment with each other, the distribution of said terminal portions transversely of said base portions being such that at least the majority of terminal portions of a layer of cords in one of said belt portions is adjacent to and overlaps at least one terminal portion of a layer of cords in the other belt portion, the terminal portions of each of said second groups being arranged in pairs and each pair of terminal portions of one of said second groups being separated from a pair of terminal portions of the other second group by at least two terminal portions of each first group, each terminal portion of said first groups being disposed between a shorter and a longer terminal portion and the ends of terminal portions of said first groups being located substantially midway between the ends of respective shorter and longer terminal portions, at least some of said terminal portions being laterally offset relative to the respective main body portions and said terminal portions being substantially uniformly spaced from each other throughout said filler portion.

6. In a reinforced belt, in combination, a first and a second elongated belt portion each including a base portion of rubber-like material and at least one layer of spaced substantially parallel reinforcing cords, said cords comprising main body portions completely surrounded by and extending in the longitudinal directions of the respective base portions and each main body portion having a terminal portion projecting beyond the respective base portion; and a filler portion of rubber-like material disposed between said base portions, said filler portion completely surrounding said terminal portions, the terminal portions of the cords in each of said layers including a first and a second group of terminal portions, the terminal portions of one of said first groups being arranged end-to-end with the terminal portions of the other first group and the terminal portions in each of said first groups being of different lengths so that a longer terminal portion of one of said first groups is arranged end-to-end with a shorter terminal portion of the other first group and vice versa, the terminal portions of said second groups being out of end-to-end alignment with each other, the distribution of said terminal portions transversely of said base portions being such that at least the majority of terminal portions of a layer of cords in one of said belt portions is adjacent to and overlaps at least one terminal portion of a layer of cords in the other belt portion, at least some of said terminal portions being laterally offset relative to the respective main body portions and said terminal portions being substantially equidistant from each other throughout said filler portion.

7. A combination as set forth in claim 6, wherein said terminal portions have tips extending along at least two spaced lines which are substantially perpendicular to the longitudinal directions of said cords.

8. A combination as set forth in claim 6, wherein said terminal portions have tips extending along at least two lines which enclose acute angles with the longitudinal direction of said cords.

9. In a reinforced belt, in combination, a first and a second elongated belt portion each including a base portion of rubber-like material and at least one layer of spaced substantially parallel reinforcing cords, said cords comprising main body portions completely surrounded by and extending in the longitudinal directions of the respective base portions and each main body portion having a terminal portion projecting beyond the respective base portion; and a filler portion of rubber-like material disposed between said base portions, said filler portion completely surrounding said terminal portions and the terminal portions of the cords in each of said layers including a first and a second group of terminal portions, the terminal portions of one of said first groups arranged end-to-end with the terminal portions of the other first group, and the terminal portions of said second groups being out of end-to-end alignment with each other, the distribution of said terminal portions transversely of said base portions being such that at least the majority of terminal portions of a layer of cords in one of said belt portions is adjacent to and overlaps at least one terminal portion of a layer of cords in the other belt portion,, at least some of said terminal portions being laterally offset relative to the respective main body portions and said terminal portions being substantially uniformly spaced from each other throughout said filler portion, each terminal portion of one of said second groups being disposed between at least one terminal portion of the other second group and at least one pair of end-to-end arranged terminal portions of said first groups, each terminal portion of said one second group overlapping the nearest terminal portion of said other second group and the ends of said first groups of terminal portions being disposed on a line extending substantially at right angles to said cords midway between said base portions.

10. A reinforced belt according to claim 1, wherein the terminal portions of said first groups of terminal portions are shorter than the terminal portions of said second groups of terminal portions.

11. In a reinforced belt, in combination, a first and a second elongated belt portion each including a base portion of rubber-like material and at least one layer of substantially equally spaced coplanar parallel reinforcing cords, said cords completely surrounded by and extending in the longitudinal direction of the respective base portions and each thereof having a terminal portion projecting beyond the respective base portion; and a joint between said belt portions comprising a filler portion disposed between and integral with said base portions, said filler portion completely surrounding said terminal portions and the terminal portions of the cords in each of said layers including a first and a second group of terminal portions, the terminal portions of one of said first groups arranged end-to-end with the terminal portions of the other first group, and the terminal portions of said second groups being out of end-to-end alignment with each other, the distribution of said terminal portions transversely of said base portions being such that at least the majority of terminal portions of a layer of cords in one of said belt portions is adjacent to and overlaps at least one terminal portion of a layer of cords in the other belt portion, all said terminal portions being substantially equally spaced from each other and disposed in a common plane within said filler portion, the spacing between said terminal portions being less than the spacing between said cords in the respective base portions and the spacing between said cords in the respective base portions being less than $2b+D$ wherein $b$ is the spacing between the terminal portions and D is the diameter of a cord.

12. In a reinforced belt, in combination, a first and a second elongated belt portion each including a base portion of rubber-like material and at least one layer of substantially equally spaced coplanar parallel reinforcing metallic cords, said cords completely surrounded by and extending in the longitudinal direction of the respective base portions and each thereof having a terminal portion projecting beyond the respective base portion; and a joint between said belt portions comprising a filler portion disposed between and integral with said base portions, said filler portion completely surrounding said terminal portions and the terminal portions of the cords in each of said layers including a first and a second group of terminal portions, the terminal portions of one of said first groups arranged end-to-end with the terminal portions of the other first group, and the terminal portions of said second groups being out of end-to-end alignment with each other, the distribution of said terminal portions transversely of said base portions being such that at least the majority of terminal portions of a layer of cords in one of said belt portions is adjacent to and overlaps at least one terminal portion of a layer of cords in the other belt portion, all said terminal portions being substantially equally spaced from each other and disposed in a common plane within said filler portion, said second groups of terminal portions being of equal length and their length being at least equal to the length of said first groups of terminal portions.

References Cited by the Examiner

UNITED STATES PATENTS

| | | | |
|---|---|---|---|
| 1,225,554 | 5/1917 | Achtmeyer | 24—38 |
| 1,261,118 | 4/1918 | Geisel | 156—157 X |
| 1,612,024 | 12/1926 | Jacobs | 198—193 X |
| 1,735,686 | 11/1929 | Kimmich | 24—38 |

FOREIGN PATENTS

| | | |
|---|---|---|
| 834,172 | 4/1958 | Great Britain. |
| 858,403 | 1/1961 | Great Britain. |

WILLIAM FELDMAN, *Primary Examiner.*

EARL M. BERGERT, DONLEY J. STOCKING,
*Examiners.*